UNITED STATES PATENT OFFICE.

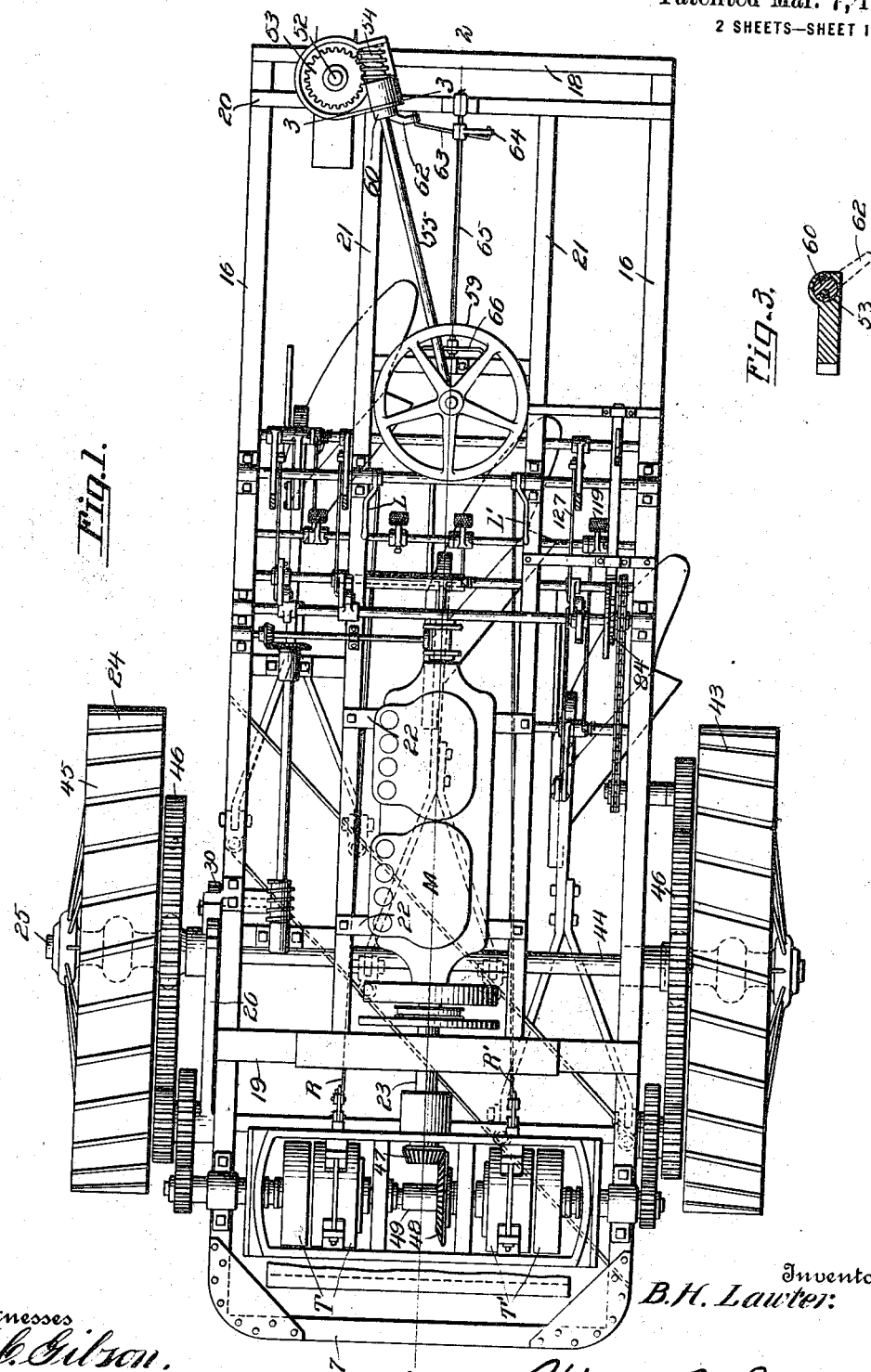

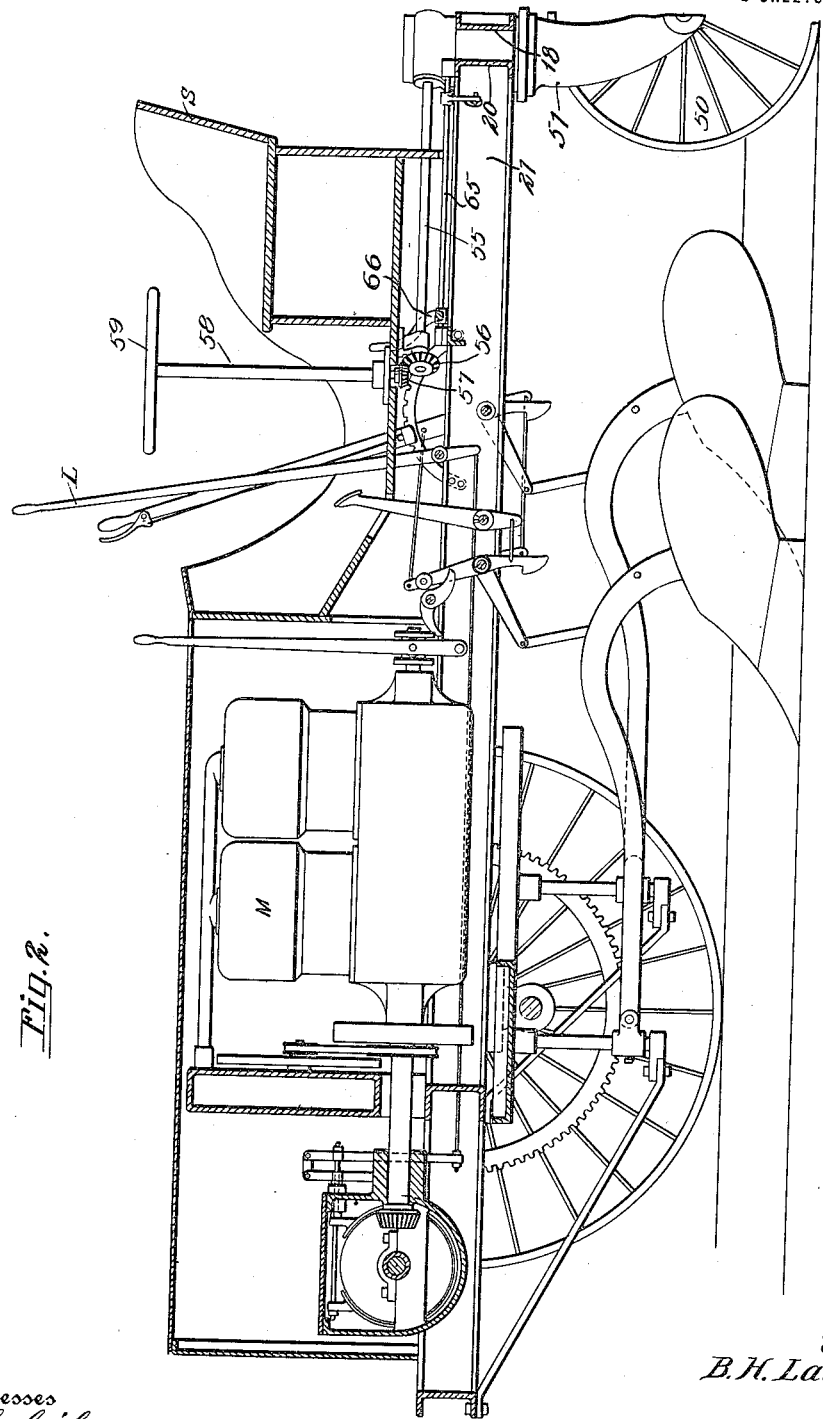

BENJAMIN H. LAWTER, OF NEWCASTLE, INDIANA, ASSIGNOR, BY DIRECT AND MESNE ASSIGNMENTS, TO THE LAWTER TRACTOR CO., OF ST. MARYS, OHIO, A CORPORATION OF OHIO.

MOTOR-PROPELLED AGRICULTURAL MACHINERY.

1,174,874.  Specification of Letters Patent.  Patented Mar. 7, 1916.

Application filed January 31, 1913. Serial No. 745,427.

*To all whom it may concern:*

Be it known that I, BENJAMIN H. LAWTER, a citizen of the United States, residing at Newcastle, in the county of Henry and State of Indiana, have invented new and useful Improvements in Motor-Propelled Agricultural Machinery, of which the following is a specification.

This invention relates to motor propelled agricultural machinery, and it has particular reference to a gang plow that is driven by a tractor of a simple and improved construction.

One object of the invention is to simplify and improve the construction of the tractor and to provide means whereby said tractor may be easily guided and enabling it to turn square corners as is necessary when plows of the customary mold board type are employed.

A further object of the invention is to simplify and improve the construction of the means whereby the plows are connected with the tractor.

With these and other ends in view, which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention; it being understood, however, that no limitation is necessarily made to the precise structural details therein exhibited, but that changes, alterations and modifications within the scope of the appended claim may be made when desired.

In the drawings: Figure 1 is a top plan view of a machine constructed in accordance with the invention. Fig. 2 is a longitudinal vertical sectional view taken on the line 2—2 of Fig. 1. Fig. 3 is a sectional detail view taken on the line 3—3 in Fig. 1.

Corresponding parts in the several figures are denoted by like characters of reference.

The frame of the improved machine is constructed mainly of steel channeled bars, although angle bars of different types may be used when preferred.

16—16 designates the side bars, 17 the front bar, 18 the rear bar, and 19—20 suitable cross bars which are connected together by longitudinal bars 21. Said longitudinal bars are also connected together at intervals by cross bars 22, some of which serve to support the motor M which may be of any preferred type and which includes the main driven shaft 23.

The land traction wheel 24 is mounted on a stub shaft or axle 25 carried by the sector 26 which is pivotally mounted at one of the side bars of the frame, in a usual manner, there being means provided as shown for moving the sector. The furrow traction wheel 43 is mounted for rotation on an axle 44 which extends across the frame of the machine. The traction wheels 24 and 43 may be of any suitable approved construction, said traction wheels being provided with broad flat treads equipped with grouts 45 for the purpose of hugging the ground. Each of said wheels is also provided with an annular gear 46.

Power is transmitted from the motor to the traction wheels by means including intermeshing beveled gears 47—48 mounted respectively on the main shaft 23 of the motor and on a transverse shaft 49. Independent transmissions T and T' are provided for transmitting motion respectively to the land wheel 24 and the furrow wheel 43, said transmissions being controlled by means of levers L and L' with which they are respectively connected by means including connecting rods R and R'. The controlling levers L and L' are arranged in convenient proximity to the right and left hands of the operator whose seat S is supported on the frame, and the transmissions, which are preferably of the planetary type are to be of such description that by proper manipulation of the controlling levers the traction wheels may be driven simultaneously in the same or in opposite directions and at the same or at various speeds; provision being preferably made for rotating said traction wheels forwardly at two or more speeds and rearwardly at one or more speeds, the direction of rotation as well as the speed being completely under the control of the operator through the medium of the levers L and L'.

The entire rearward end of the main frame is supported by a caster wheel 50 which is also normally used for steering, said caster wheel being mounted in a fork 51 carried by a shaft 52 having a worm gear 53 meshing with a worm 54 on a shaft 55 which is connected by intermeshing beveled gears 56—57 with a steering post 58 having a hand wheel 59 whereby it may be rotated for the purpose of effecting adjustment of the caster wheel for the purpose of steering the machine under ordinary circumstances. The worm carrying end of the shaft 55 is mounted in an eccentric 60 supported for rotation in a sleeve or bearing and having an arm 62 which is connected by a link 63 with an arm 64 extending radially from a suitably supported rock shaft 65 having at its front end a cross bar 66 constituting a treadle whereby the rock shaft may be oscillated by the feet of the operator. By oscillating the rock shaft the eccentric 60 may be partly rotated, thereby moving the worm 54 out of or into engagement with the worm gear 53. It will be obvious that when the worm is in mesh with the worm gear the caster wheel may be actuated by the hand wheel 59 for the purpose of steering the machine; when the worm 54 and the worm gear 53 are out of mesh the shaft carrying the fork in which the caster wheel is journaled is left free for rotation about its axis, thereby permitting the caster wheel to adjust itself to steering of the machine effected by the traction wheels by rotating said traction wheels in opposite directions, or by rotating one of said wheels while the other is permitted to remain stationary. In the latter case the machine will be caused to pivot about the stationary traction wheel; in the former case the machine may be turned in a space slightly exceeding its own length as will be readily understood. The ability to make short turns, as set forth, is particularly important when the structure is used for operating a gang of plows of the customary mold board type with which the present machine is equipped as will be now described.

From the foregoing description taken in connection with the drawings hereto annexed, the operation and advantages of this invention will be readily understood. The tractor, while particularly adapted for operating a gang plow, may obviously be utilized for other purposes.

Having thus described the invention, what is claimed as new, is:—

A machine of the character described comprising a frame, which includes longitudinally disposed spaced beams and transversely disposed spaced bars located at the rear end of the frame and extending from side to side thereof, a motor mounted upon the frame, traction wheels located one at each side of the frame and at points between the front and rear ends thereof, means for driving the traction wheels from the motor, a caster wheel pivoted to the frame in the vicinity of one of the rear corners thereof, and at a point in alinement with the space between one of the side longitudinally disposed beams and the next adjacent beam and in the space between the cross bars at the rear of the frame, means mounted upon the frame and movable with relation to the same to operatively engage the pivot of the caster wheel, and means mounted upon the frame for operating the pivot engaging means to steer the caster wheel.

In testimony whereof I affix my signature in presence of two witnesses.

BENJAMIN H. LAWTER.

Witnesses:
HERBERT HEWIT,
FRANZ D. RICHARDSON.

Copies of this patent may be obtained for five cents each, by addressing the "Commissioner of Patents, Washington, D. C."